United States Patent
Zhang et al.

(10) Patent No.: US 9,020,564 B2
(45) Date of Patent: Apr. 28, 2015

(54) SELF-CONFIGURING SMALL SCALE BASE STATION

(75) Inventors: Yan Zhang, Bellevue, WA (US); Donald P. Wahlstrom, Woodinville, WA (US)

(73) Assignee: Broadcom Corporation, Irvine, CA (US)

( * ) Notice: Subject to any disclaimer, the term of this patent is extended or adjusted under 35 U.S.C. 154(b) by 1414 days.

(21) Appl. No.: 12/221,463

(22) Filed: Jul. 31, 2008

(65) Prior Publication Data
US 2009/0047945 A1    Feb. 19, 2009

Related U.S. Application Data

(60) Provisional application No. 60/965,116, filed on Aug. 17, 2007, provisional application No. 60/965,193, filed on Aug. 17, 2007.

(51) Int. Cl.
*H04M 1/00* (2006.01)
*H04W 84/04* (2009.01)
*H04W 88/08* (2009.01)
*H04W 24/02* (2009.01)

(52) U.S. Cl.
CPC ........... *H04W 84/045* (2013.01); *H04W 24/02* (2013.01); *H04W 88/08* (2013.01)

(58) Field of Classification Search
CPC ... H04W 76/02; H04W 84/045; H04W 88/08; H04W 24/02
USPC ................... 455/418–420, 435.1–435.3, 561
See application file for complete search history.

(56) References Cited

U.S. PATENT DOCUMENTS

| | | | |
|---|---|---|---|
| 7,885,639 B1 * | 2/2011 | Satish et al. | 455/410 |
| 8,089,400 B1 * | 1/2012 | Fang et al. | 342/357.42 |
| 2006/0120305 A1 * | 6/2006 | Van Den Bosch et al. | 370/254 |
| 2007/0097939 A1 * | 5/2007 | Nylander et al. | 370/338 |
| 2007/0097983 A1 * | 5/2007 | Nylander et al. | 370/395.2 |
| 2007/0183427 A1 * | 8/2007 | Nylander et al. | 370/395.2 |
| 2008/0009286 A1 * | 1/2008 | Hur et al. | 455/435.1 |
| 2008/0102794 A1 * | 5/2008 | Keevill et al. | 455/411 |

FOREIGN PATENT DOCUMENTS

WO    WO 2007/015066 A2    2/2007

* cited by examiner

*Primary Examiner* — George Eng
*Assistant Examiner* — Marcus Hammonds
(74) *Attorney, Agent, or Firm* — Sterne, Kessler, Goldstein & Fox, P.L.L.C.

(57) ABSTRACT

A self-configuring mobile telecommunication base station is disclosed. A communication interface is configured to connect to an access network other than a mobile telecommunication network with which the base station is associated. A processor coupled to the communication interface is configured to establish a connection, at least in part via the access network, to an element associated with the mobile telecommunication network; receive via the access network an initialization data; and use the initialization data to configure the base station to provide access to mobile telecommunication services at least in part using a resource determined based at least in part on the initialization data.

20 Claims, 25 Drawing Sheets

| Routing Zone | MCC | MNC | LAC | CI | UARFCN | Code Group | FCid | Scrambling Code |
|---|---|---|---|---|---|---|---|---|
| 1111 | 234 | 02 | 1 | 1 | 10700 | 0 | | |
| 1111 | 234 | 02 | 2 | 1 | 10700 | 0 | | |
| 1111 | 234 | 02 | ..... | 1 | 10700 | 0 | | |
| 1111 | 234 | 02 | 65534 | 1 | 10700 | 0 | | |
| 2222 | 234 | 02 | 1 | 2 | 10700 | 0 | | |
| 2222 | 234 | 02 | ..... | 2 | 10700 | 0 | | |
| 2222 | 234 | 02 | 65534 | 2 | 10700 | 0 | | |
| ..... | 234 | 02 | ..... | ..... | 10700 | 0 | | |

FIG. 8A

| Routing Zone | MCC | MNC | LAC | CI | BSIC | FCid | ARFCN |
|---|---|---|---|---|---|---|---|
| 1111 | 234 | 16 | 1 | 1 | 28 | | |
| 1111 | 234 | 16 | 2 | 1 | 28 | | |
| 1111 | 234 | 16 | ...... | 1 | 28 | | |
| 1111 | 234 | 16 | 65534 | 1 | 28 | | |
| 2222 | 234 | 16 | 1 | 2 | 28 | | |
| 2222 | 234 | 16 | ...... | 2 | 28 | | |
| 2222 | 234 | 16 | 65534 | 2 | 28 | | |
| ...... | 234 | 16 | ...... | ...... | 28 | | |

842

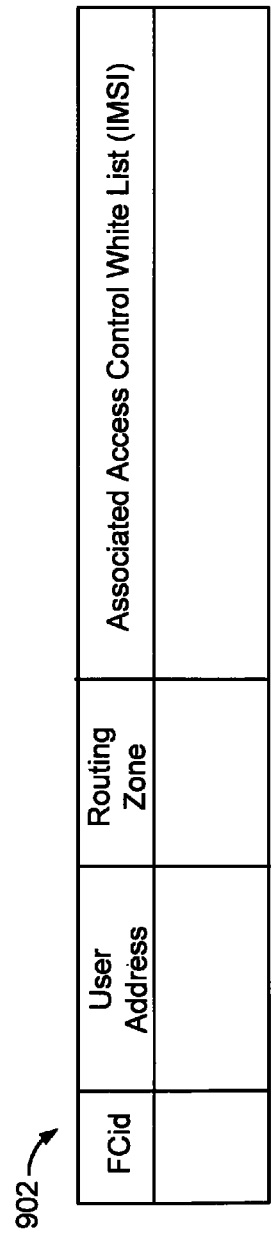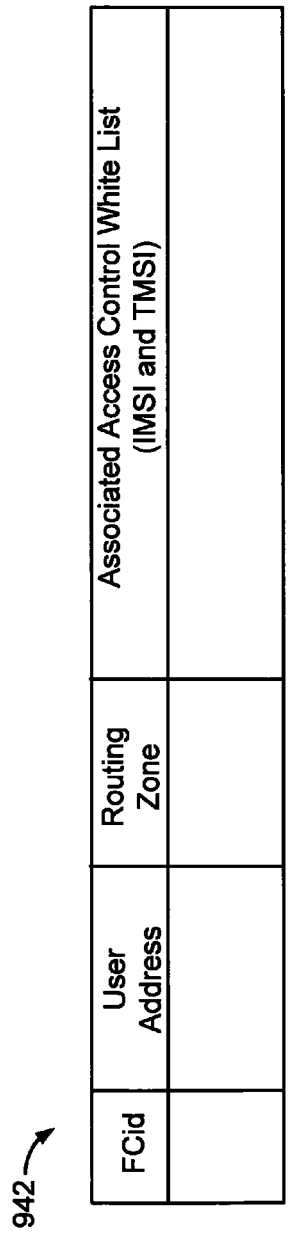

| FCid | Routing Zone | MCC | MNC | LAC | CI | Associated Access Control White List (IMSI) |
|---|---|---|---|---|---|---|
| | | | | | | |

| FCid | Routing Zone | MCC | MNC | LAC | CI | Associated Access Control White List (IMSI and TMSI) |
|---|---|---|---|---|---|---|
| | | | | | | |

| Routing Zone | MCC | MNC | LAC | CI | UARFCN | Code Group | FCid | Scrambling Code |
|---|---|---|---|---|---|---|---|---|
| 1111 | 234 | 02 | 1 | 1 | 10700 | 0 | 123456789 | |
| 1111 | 234 | 02 | 2 | 1 | 10700 | 0 | | |
| 1111 | 234 | 02 | ...... | 1 | 10700 | 0 | | |
| 1111 | 234 | 02 | 65534 | 1 | 10700 | 0 | | |
| 2222 | 234 | 02 | 1 | 2 | 10700 | 0 | | |
| 2222 | 234 | 02 | ...... | 2 | 10700 | 0 | | |
| 2222 | 234 | 02 | 65534 | 2 | 10700 | 0 | | |
| ...... | 234 | 02 | ...... | | 10700 | 0 | | |

| Routing Zone | MCC | MNC | LAC | CI | UARFCN | Code Group | FCid | Scrambling Code |
|---|---|---|---|---|---|---|---|---|
| 1111 | 234 | 02 | 1 | 1 | 10700 | 0 | 123456789 | 2 |
| 1111 | 234 | 02 | 2 | 1 | 10700 | 0 | | |
| 1111 | 234 | 02 | ...... | 1 | 10700 | 0 | | |
| 1111 | 234 | 02 | 65534 | 1 | 10700 | 0 | | |
| 2222 | 234 | 02 | 1 | 2 | 10700 | 0 | | |
| 2222 | 234 | 02 | ...... | 2 | 10700 | 0 | | |
| 2222 | 234 | 02 | 65534 | 2 | 10700 | 0 | | |
| ...... | 234 | 02 | ...... | ...... | 10700 | 0 | | |

FIG. 16B

| Routing Zone | MCC | MNC | LAC | CI | BSIC | FCid | ARFCN |
|---|---|---|---|---|---|---|---|
| 1111 | 234 | 16 | 1 | 1 | 28 | 123456789 | 888 |
| 1111 | 234 | 16 | 2 | 1 | 28 | | |
| 1111 | 234 | 16 | ..... | 1 | 28 | | |
| 1111 | 234 | 16 | 65534 | 1 | 28 | | |
| 2222 | 234 | 16 | 1 | 2 | 28 | | |
| 2222 | 234 | 16 | ..... | 2 | 28 | | |
| 2222 | 234 | 16 | 65534 | 2 | 28 | | |
| ..... | 234 | 16 | ..... | ..... | | | |

| FCid | MCC | MNC | LAC | CI | BSIC | ARFCN | NB Cells |
|---|---|---|---|---|---|---|---|
| 123456789 | 234 | 16 | 1 | 1 | 28 | 888 | 777 |

| FCid | Routing Zone | MCC | MNC | LAC | CI | Associated Access Control White List (IMSI and TMSI) |
|---|---|---|---|---|---|---|
| 123456789 | 1111 | 234 | 16 | 1 | 1 | IMSI #1<br>IMSI #2 |

SELF-CONFIGURING SMALL SCALE BASE STATION

CROSS REFERENCE TO OTHER APPLICATIONS

This application claims priority to U.S. Provisional Patent Application No. 60/965,116, entitled GSM FLATRAN PLUG & PLAY FOR GUARD BAND MNOS filed Aug. 17, 2007, which is incorporated herein by reference for all purposes; and this application claims priority to U.S. Provisional Patent Application No. 60/965,193, entitled UMTS FEMTOCELL PLUG & PLAY SYSTEM SOLUTIONS filed Aug. 17, 2007, which is incorporated herein by reference for all purposes.

BACKGROUND OF THE INVENTION

In a traditional macrocellular mobile telecommunication network, large scale base stations are deployed and provide access to mobile telecommunication services in a coverage area served by the base station. A typical macrocellular base station is a substantial installation and includes a tower or other structure on which one or more antennas are mounted, as well as other equipment configured to provide connectivity to a core mobile telecommunications network with which the base station is associated. Careful planning typically goes into selecting the radio frequencies, channels, codes, and other resources that will be used by such a macrocellular base station, and skilled engineers and technicians typically spend many hours building the base station and deploying and configuring associated equipment.

Femtocells and other small scale base stations have been developed to enable mobile telecommunications subscribers to have access to mobile telecommunication service in remote or otherwise unserved or underserved areas and/or to have bandwidth dedicated to their use. In contrast to macrocellular base stations, femtocells and other small scale base stations may be deployed anywhere, and numerous such base stations, each with a relatively very small coverage area, may be deployed, sometimes in areas served concurrently by one or more macrocellular networks. Each femtocell must be configured to connect to, and provide access to mobile telecommunication services via, a mobile telecommunications network, and to be assigned and use RF and other resources that will not result in interference with other elements or other problems.

Mobile telecommunication user equipment, such a cell phones, personal digital assistants, etc., typically are sold through retail locations, often operated by mobile network operators and/or their affiliates or partners. The retail personnel who work at such retail locations typically are trained to demonstrate user equipment features, configure phones for use with the mobile network operator's network, and collect subscriber information necessary to provide service to and obtain payment from the subscriber. Such retail personnel typically do not have the same level of knowledge or skill as the engineers and technicians typically involved in planning for and configuration and deployment of a macrocellular base station.

BRIEF DESCRIPTION OF THE DRAWINGS

Various embodiments of the invention are disclosed in the following detailed description and the accompanying drawings.

FIG. 8A is a block diagram illustrating an embodiment of a bulk configuration table for UMTS femtocells.

FIG. 9A is a block diagram illustrating an embodiment of an access control database table for UMTS femtocells.

FIG. 9B is a block diagram illustrating an embodiment of an access control database table for GMS femtocells.

FIG. 10A is a block diagram illustrating an embodiment of an access control table for UMTS femtocells.

FIG. 10B is a block diagram illustrating an embodiment of an MSC server access control table for GSM femtocells.

FIG. 16A shows EMS CPE configuration data table 802 of FIG. 8A with the FCid field filled in.

FIG. 16B shows EMS CPE configuration data table 802 of FIG. 8A with both the FCid field and scrambling code field filled in.

FIG. 22 shows an example of the bulk configured CPE configuration data 842 of FIG. 8B as populated by an EMS or other node.

FIG. 23 shows an example of local CPE configuration table 704 as populated by a GSM CPE in connection with self-configuration.

FIG. 24 shows the MSC server CPE configuration data table 1042 of FIG. 10B as populated by the MSC server in connection with CPE startup as described above in connection with FIG. 21.

DETAILED DESCRIPTION

Figure 1:
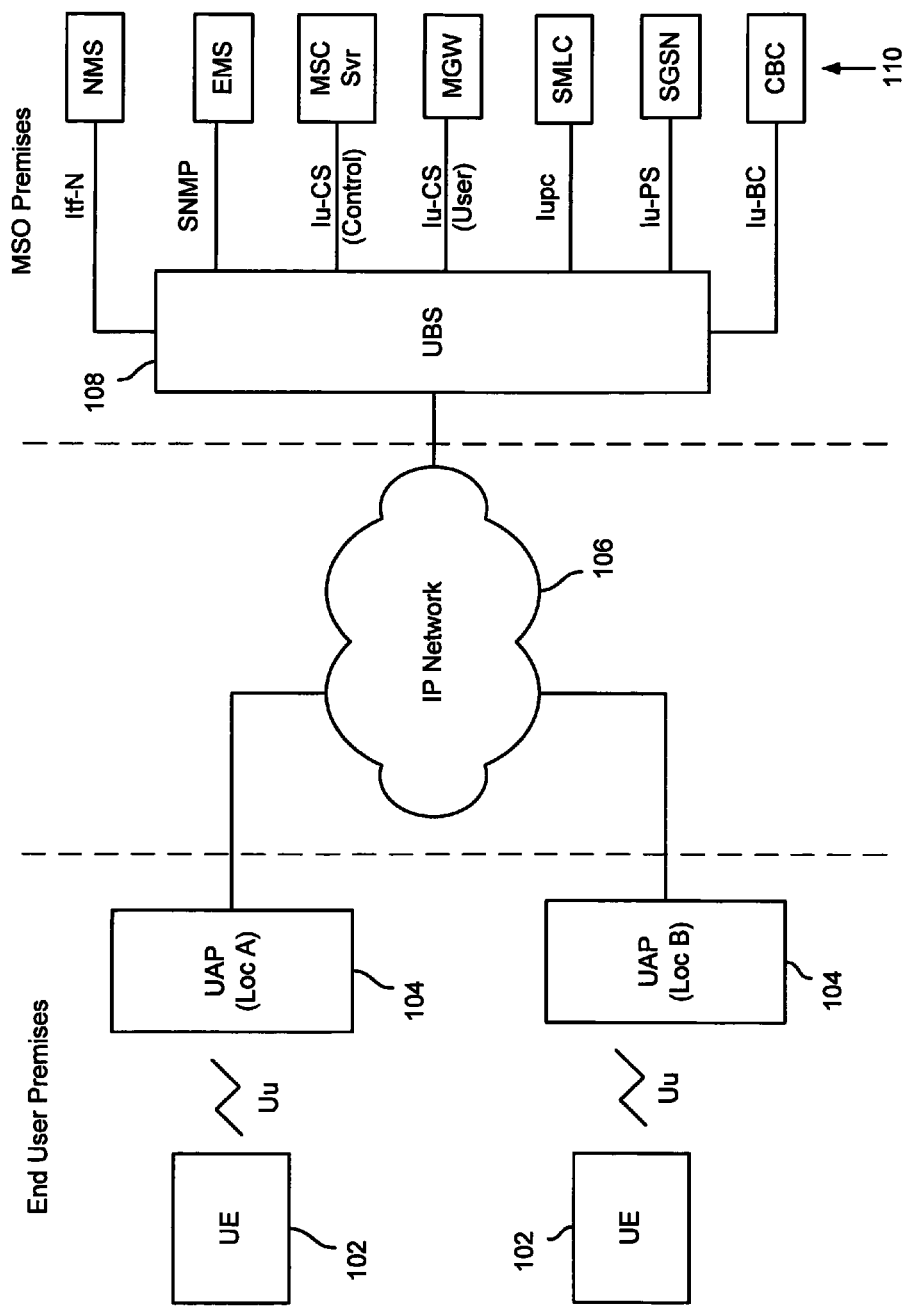
FIG. 1 is a block diagram illustrating an embodiment of a system in which small scale base station access to a Uniform Mobile Telecommunication System (UMTS) network is provided.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A self-configuring small scale base station is disclosed. In some embodiments, upon being connected to an Internet protocol (IP) or other network, such as the Internet, the small scale base station auto-discovers a registration server or other element associated with a mobile telecommunications network. The small scale base station is assigned, automatically and without human intervention, one or more resources and/or other initialization data to be used by the small scale base station to configure itself for operation. In some embodiments, the assignment is made based at least in part on subscriber information gathered and/or associated with the small scale base station at a point of sale at which the small scale base station was sold, rented, leased, etc. The small scale base station uses the assigned resource(s) and/or other initialization information to configure itself for operation and becomes available for use to communicate via the mobile telecommunication network. Examples of an assigned resource include a radio frequency (RF) channel and/or a scrambling code. In some embodiments, the small scale base station scans the local RF environment to determine whether a candidate, potential, and/or assigned resource is suitable for use in the particular location in which the small scale base station has been installed, e.g., to determine whether use of resource results or would result in interference with one or more other small scale and/or macrocellular base stations, or other transmitters, operating in the environment.

FIG. 1 is a block diagram illustrating an embodiment of a system in which small scale base station access to a Uniform Mobile Telecommunication System (UMTS) network is provided. In the example shown, user equipment 102, such as UMTS mobile phones, communicate via the Uu air interface with a UMTS access point (UAP) 104, each of which in some embodiments comprises a small scale base station. The access points 104 are connected in this example via an IP network 106, such as the Internet, with a UMTS backend server (UBS) 108 configured to provide connectivity to UMTS network elements 110 via the respective interfaces indicated in FIG. 1.

Figure 2:
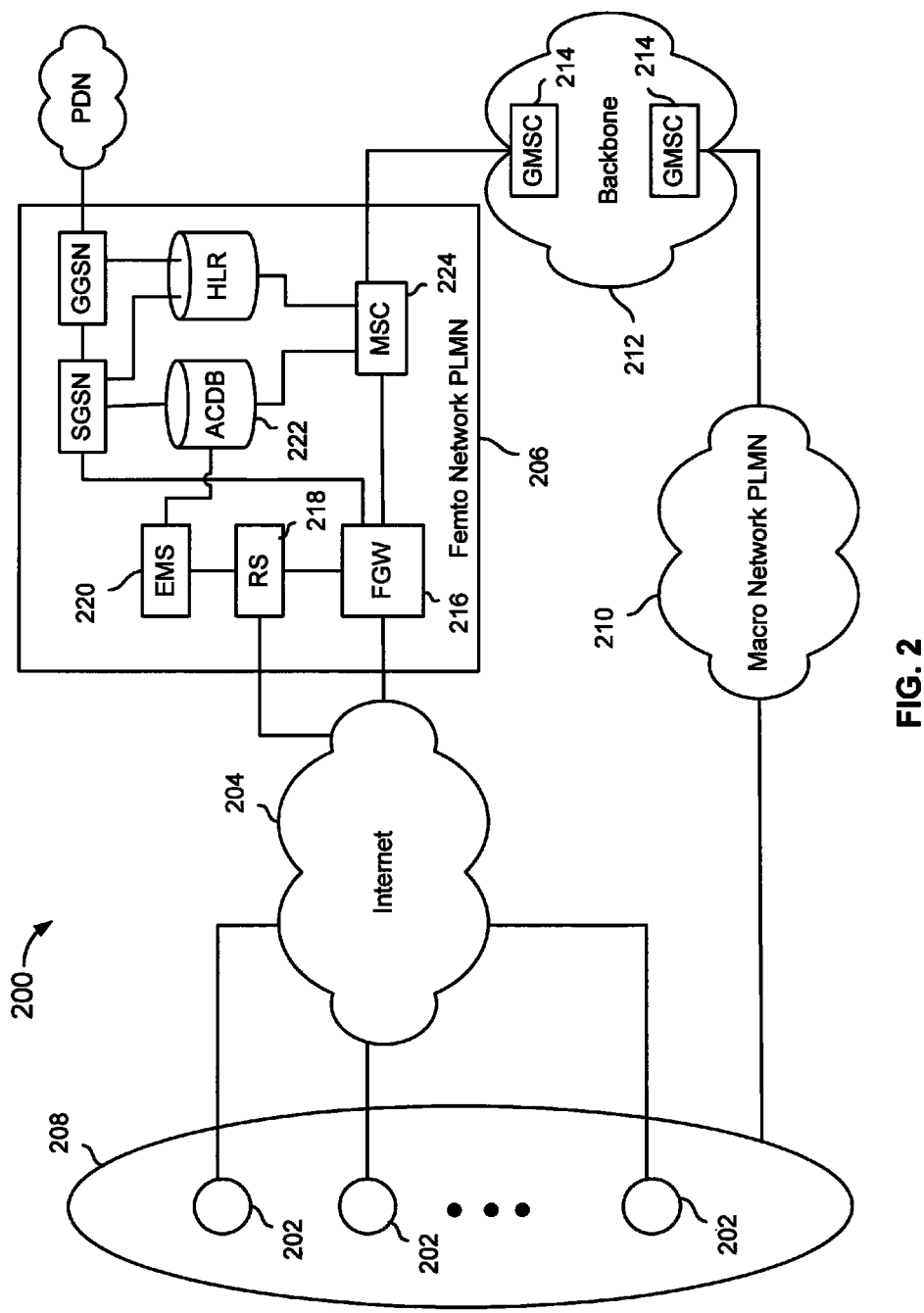
FIG. 2 is a block diagram illustrating an embodiment of a public land mobile network (PLMN) configured to provide access to a UMTS mobile telecommunication network via one or more small scale base stations (e.g., femtocells).

FIG. 2 is a block diagram illustrating an embodiment of a public land mobile network (PLMN) configured to provide access to a UMTS mobile telecommunication network via one or more small scale base stations (e.g., femtocells). In the example shown, each of a plurality of femtocells 202 provides coverage in relatively small coverage area. The femtocells 202 connect via the Internet 204 with a femto network PLMN 206. The femtocells 202 provide coverage in an area that is also served by a macrocellular network represented in FIG. 2 by coverage area 208 and associated macro network PLMN 210. Each of femto network PLMN 206 and macro network PLMN 210 is connected to a backbone network 212 via a gateway mobile service center (GMSC) 214. The femto network PLMN 206 includes a femtocell gateway (FGW) 216, registration server (RS) 218, and element management server (EMS) 220, which in some embodiments are hosted in one or more physical systems ("boxes"), such as the UMTS backend server 108 of FIG. 1. As shown in FIG. 2, femtocells 202 have connectivity via the Internet 204 to FGW 216 and RS 218. RS 218 is configured in some embodiments to establish a connection with a femtocell (or other small scale base station) on initial startup, e.g., after being purchased by a customer, connected to an Internet connection, and started up, and is configured in some embodiments to authenticate the femtocell and provide and/or facilitate in providing to the femtocell configuration data required by the femtocell to configure itself. EMS 220 receives via RS 218 an identifier, e.g., MAC address, associated with the registering femtocell 202 and consults an access control database (ACDB) 222 to determine configuration data for the femtocell, e.g., an RF channel, code group, and/or scrambling code candidates that have not yet been assigned to another femtocell and would be appropriate for use in a geographic location in which the femtocell is determined to be located, e.g., a purchasing subscriber's address as collected at the point of sale. Once a femtocell has configured itself, FGW 216 establishes a secure tunnel connection to a mobile switch center (MSC) 224, referred to in some embodiments as a femtocell concentrator or aggregation node. MSC 224 is configured to provide to femtocells and associated user equipment, via the secure tunnels set up by the FGW 216 and the MSC's connection to backbone network 212, access to mobile telecommunication services. The remaining elements shown in FIG. 2 operate as in a typical UMTS PLMN.

Figure 3:
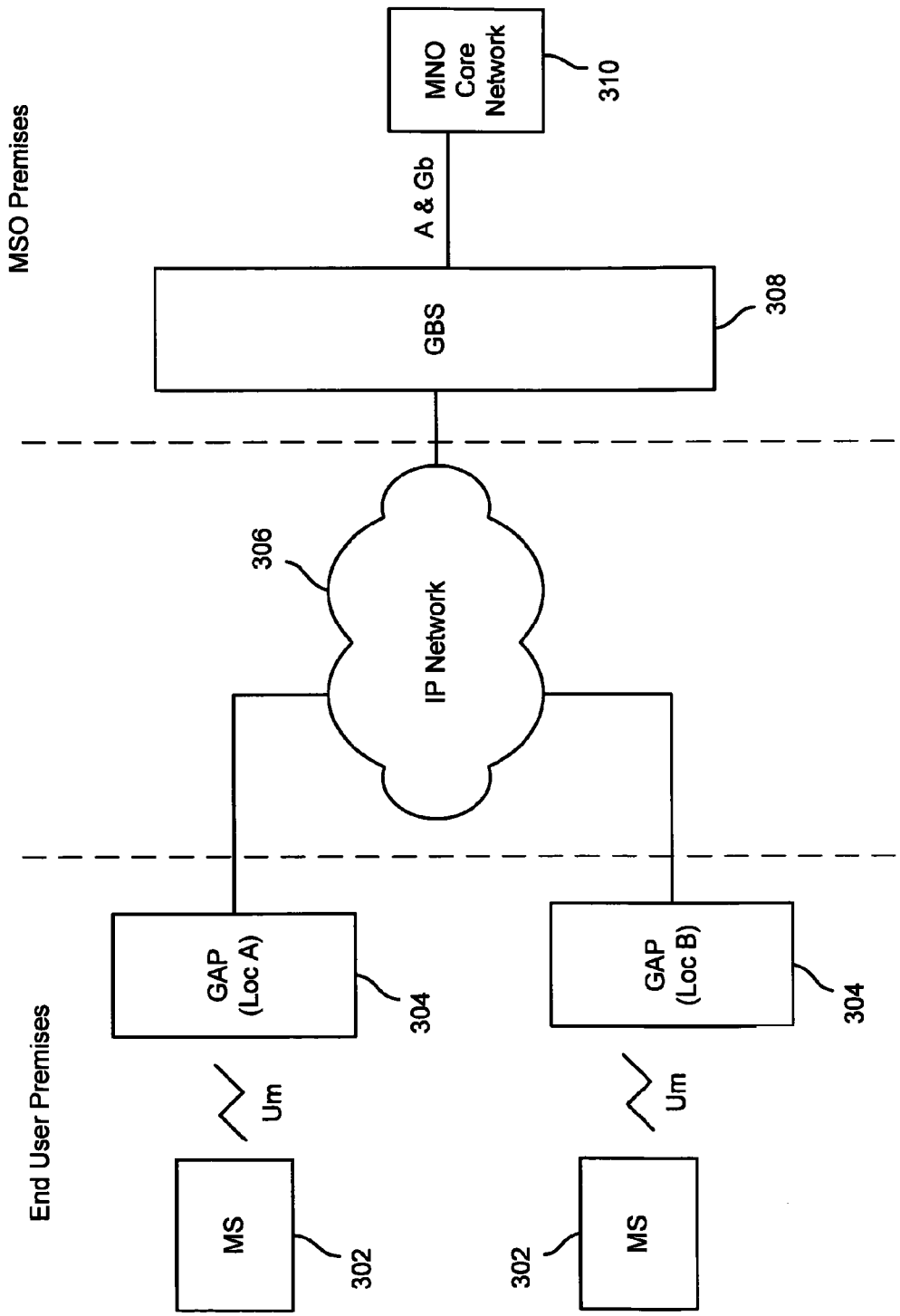
FIG. 3 is a block diagram illustrating an embodiment of a system in which small scale base station access to a Global System for Mobile Communications (GSM) mobile network is provided.

FIG. 3 is a block diagram illustrating an embodiment of a system in which small scale base station access to a Global System for Mobile Communications (GSM) mobile network is provided. In the example shown, mobile stations (MS) 302 communicate via the Um air interface to GSM access points (GAP) 304, e.g., femtocells. Each GAP 304 is connected via IP network 306, e.g., the Internet, to a GSM/GPRS backend server (GBS) 308 configured to provide access to a mobile network operator (MNO) core network 310, e.g., via the A (voice) and Gb (packet data) interfaces.

Figure 4:
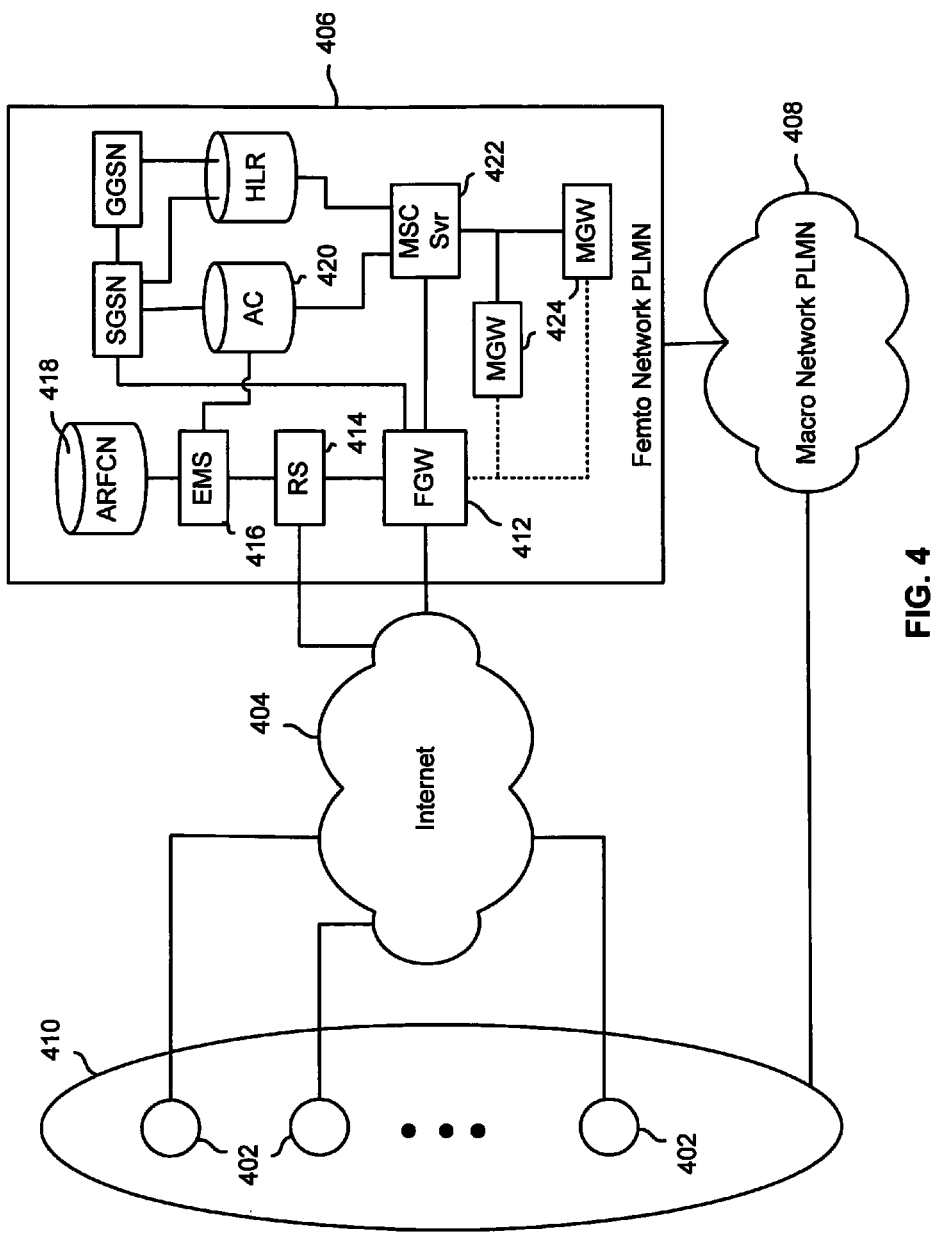
FIG. 4 is a block diagram illustrating an embodiment of a public land mobile network (PLMN) configured to provide access to a GSM mobile telecommunication network via one or more small scale base stations (e.g., femtocells).

FIG. 4 is a block diagram illustrating an embodiment of a public land mobile network (PLMN) configured to provide access to a GSM mobile telecommunication network via one or more small scale base stations (e.g., femtocells). In the example shown, each of a plurality of femtocells 402 connects via the Internet 404 with a femto network PLMN 406. The femtocells 402 provide coverage in an area that is also served by a macrocellular network represented in FIG. 4 by macro network PLMN 408 and coverage area 410. In the example shown, femto network PLMN 406 includes femtocell gateway (FGW) 412, a registration server (RS) 414, and an element management server (EMS) 416. In some embodiments, the RS 414 and EMS 416 operate similarly to the corresponding elements in FIG. 2, modified as appropriate to the GSM context. EMS 416 is connected to an absolute radio frequency channel number (ARFCN) database 418, used in some embodiments to enable multiple MNOs to coordinate the sharing of RF channels made available for their shared use for femtocell operation, such as the GSM guard band as licensed in the United Kingdom. EMS 416 also has a connection to an access control (AC) database 420 used in some embodiments to ensure that only authorized users access the mobile telecommunications network via a femtocell, e.g., a user authorized to use femtocells generally and/or a user authorized to use a particular femtocell via which an attempt to communicate is made. FGW 412 is configured to aggregate traffic from mobile systems associated with a plurality of femtocells 402 and to provide connectivity via MSC server 422 and media gateways (MGW) 424 to macro network PLMN 408.

While the examples shown in FIGS. 1-4 show UMTS and GSM networks the techniques described herein may be used in other mobile telecommunication networks in which small scale base stations or similar access nodes are used to provide access to mobile telecommunications services.

Prior to Sale

Figure 5:
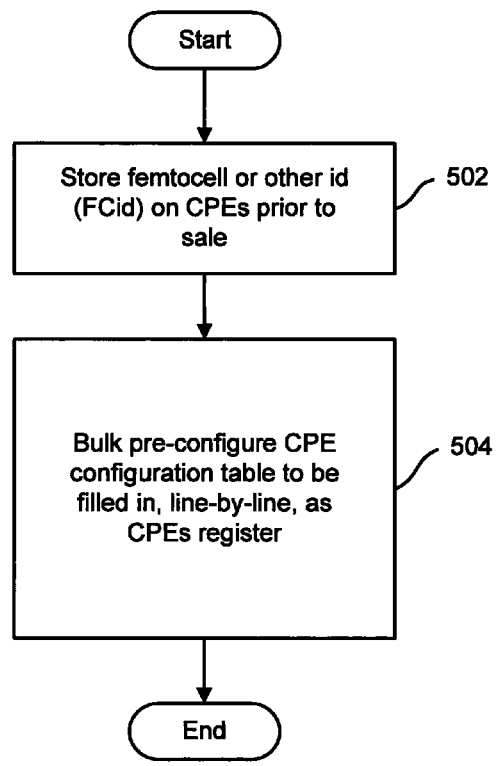
FIG. 5 is a flow chart illustrating an embodiment of a process for facilitating the self-configuration, at initial startup and/or connection time, of a small scale base station or other customer premises equipment (CPE).

FIG. 5 is a flow chart illustrating an embodiment of a process for facilitating the self-configuration, at initial startup and/or connection time, of a small scale base station or other customer premises equipment (CPE). In the example shown, prior to sale CPEs, such as femtocells or other small scale base stations, are configured to auto-discover a registration server or other node, e.g., upon first being connected to the Internet and/or another public or private IP network, receive initialization data via the IP network (e.g., a resource or resource pool, such as a code group), and self-configure for mobile telecommunication base station operations using the received initialization data (502). In various embodiments, a CPE is CPE configured to use minimal resource or other initialization data received from the network, upon first being connected to an IP or other network, combined with additional information determined by the CPE itself, e.g., by scanning a surrounding RF environment, to configure itself for operation. In some embodiments, the CPEs are configured by an OEM, MNO, and/or other entity prior to being delivered to a retail outlet for distribution (e.g., by sale, lease, rental, loan, or otherwise) to end users, e.g., by installing a femtocell id (FCid) or other identifier and/or logic used by the CPE to perform auto-discovery and self-configuration (502). A CPE configuration table or other data store is preconfigured, in bulk, with a plurality of sets (e.g., rows) of configuration data each containing resources available to be associated with CPEs as they register (504). Examples of such resources include code sets, scrambling codes, and RF channels. In some embodiments, on registration initialization data to be sent to a registering CPE is selected at least in part by mapping an identifier associated with and received from the CPE, e.g., a MAC address or other FCid, to a geographic location (e.g., a premises address collected at the point of sale) and selecting an available set of configuration data from the bulk configuration table based at least in part on the geographic location, e.g., as described more fully below.

Figure 6:
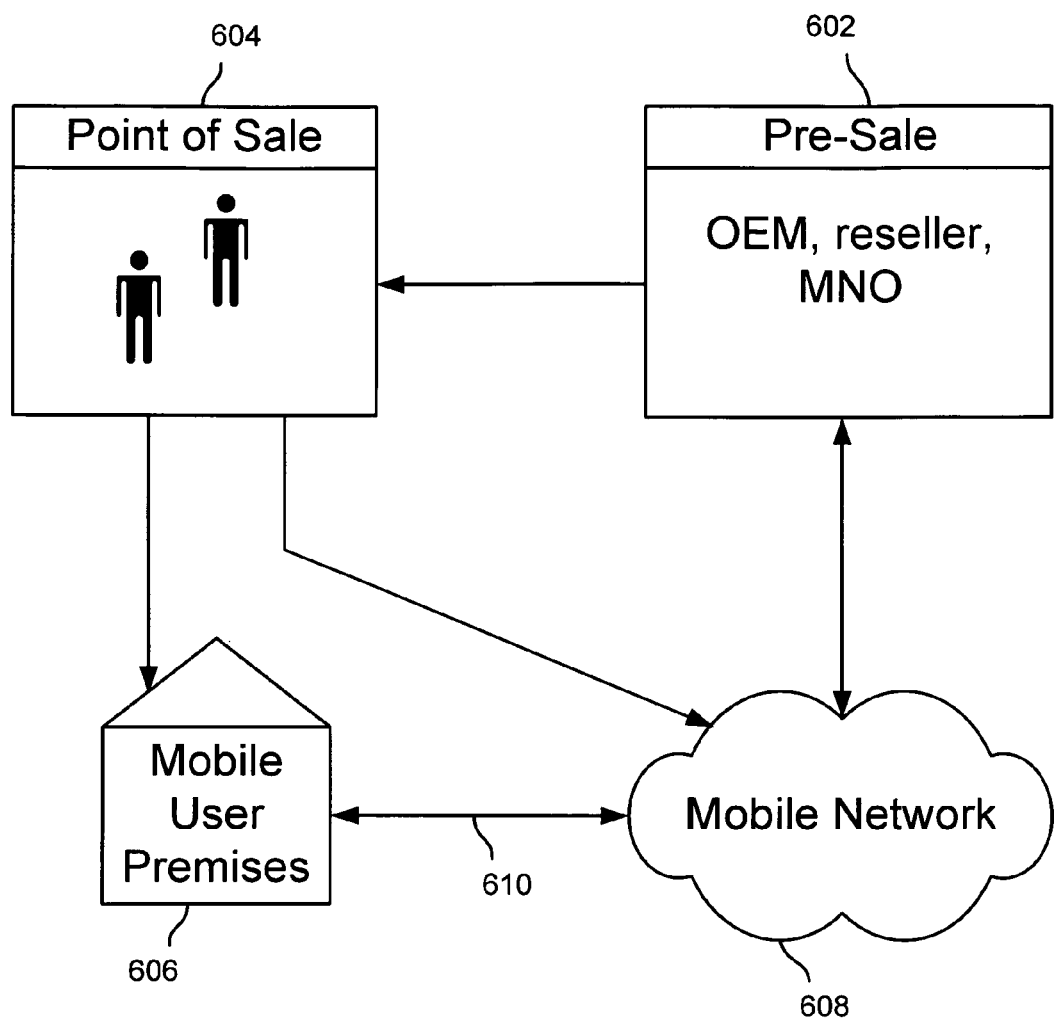
FIG. 6 is a block diagram illustrating an embodiment of a technique for deploying and providing for the self-configuration of femtocells or other mobile telecommunication customer premises equipment (CPE).

FIG. 6 is a block diagram illustrating an embodiment of a technique for deploying and providing for the self-configuration of femtocells or other mobile telecommunication customer premises equipment (CPE). In the example shown, an original equipment manufacturer (OEM) and/or reseller of the CPE and/or a mobile network operator (MNO) of the mobile telecommunication network with which the CPE is to be used (602) pre-configures the CPE to auto-discover a mobile network registration server or other element, as described above, and use limited resource and/or other initialization information provided by the mobile network to configure itself automatically. At a point of sale (604), a purchasing customer provides an address of a mobile user premises (606) at which the CPE will be used, and/or other account information, to a retail salesperson or other representative, who then provides an identifier for the CPE (e.g., MAC address, referred to in some embodiments below as "FCid" for "femtocell id") the customer premises address and/or other information, such as phone numbers, IMSIs, TMSIs, and/or other identifiers of subscribers and/or other users who will be permitted to access the network via the CPE, to the mobile network (608), e.g., by posting the information to a point of sale, account, and/or access control and/or CPE configuration database. In some embodiments, a graphical user interface (GUI) or other input interface is provided to retail personnel at the point of sale (604) to enable such personnel to capture and submit required information without requiring a high level of technical skill or training. In some embodiments, retail sales processing systems block a purchase (or other) transaction from being completed until confirmation is received that CPE address and "white list" (authorized user) information has been obtained and submitted successfully to the mobile network (608). The CPE when first connected to the mobile network via a network connection (610) to a connecting network other than the mobile telecommunication network, such as an Internet or other pubic or private IP network, the CPE auto-discovers a registration node, receives initialization data, and self-configures as described herein.

Figure 7A:
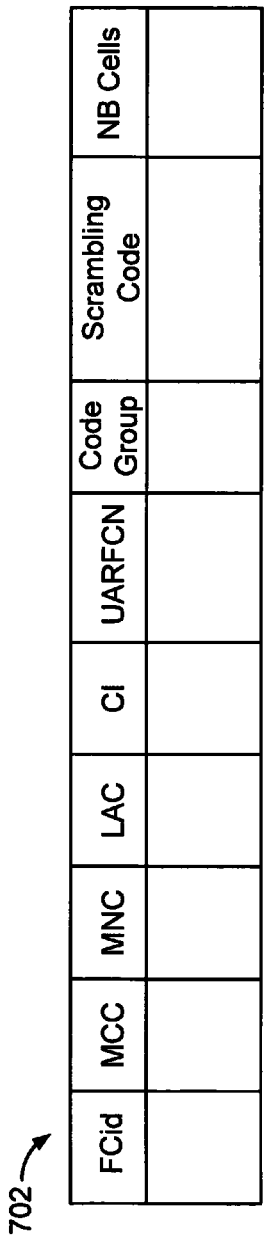
FIG. 7A is a block diagram illustrating an example of a CPE configuration table or other data store used to store configuration data on a UMTS femtocell.

FIG. 7A is a block diagram illustrating an example of a CPE configuration table or other data store used to store configuration data on a UMTS femtocell. In the example shown, the CPE configuration data table 702 includes locations for storing the following: "FCid" or "femtocell id", an identifier associated uniquely, at least locally, with the CPE, such as a MAC address, stored in some embodiments along with security keys in a SIM or other secure module on the CPE; a mobile country code (MCC) in which the CPE is authorized and/or configured to be used; a mobile network code (MNC) associated with a mobile carrier with which the CPE is to be used; a location area code (LAC) associated with a location area in which the CPE is to be used; a cell identifier (CI) that identifies the CPE-associated cell with the location area (LA); a UMTS absolute radio frequency channel number (UARFCN) indicating the channel on which the CPE will broadcast; a code group with which a scrambling code to be used by the CPE is associated; the scrambling code assigned to the CPE for use; and a list of neighbor (NB) cells, if any, to/from which the CPE may be required to handover active calls.

Figure 7B:
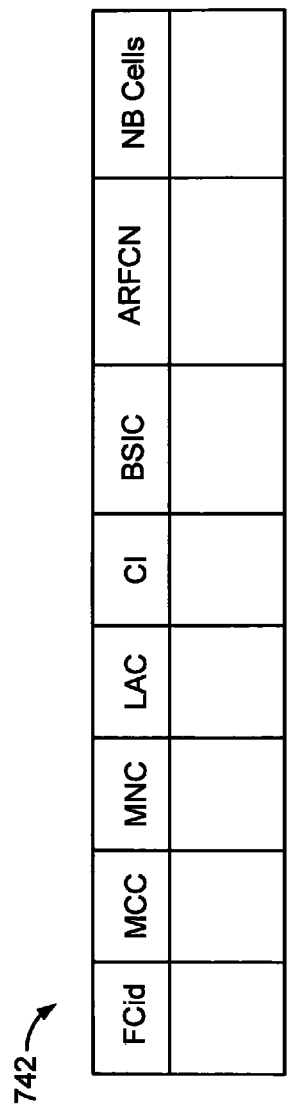
FIG. 7B is a block diagram illustrating an example of a CPE configuration table or other data store used to store configuration data on a GSM femtocell.

FIG. 7B is a block diagram illustrating an example of a CPE configuration table or other data store used to store configuration data on a GSM femtocell. In the example shown, the CPE configuration data table 742 includes locations for storing the following: "FCid" or "femtocell id", an identifier associated uniquely, at least locally, with the CPE, such as a MAC address, stored in some embodiments along with security keys in a SIM or other secure module on the CPE; a mobile country code (MCC) in which the CPE is authorized and/or configured to be used; a mobile network code (MNC) associated with a mobile carrier with which the CPE is to be used; a location area code (LAC) associated with a location area in which the CPE is to be used; a cell identifier (CI) that identifies the CPE-associated cell with the location area (LA); a base station identifier code (BSIC), which the femtocell will broadcast on the synchronization channel; an absolute radio frequency channel number (ARFCN) indicating the channel on which the CPE will broadcast; and a list of neighbor (NB) cells, if any, to/from which the CPE may be required to handover active calls.

FIG. 8A is a block diagram illustrating an embodiment of a bulk configuration table for UMTS femtocells. The bulk configuration table 802 is stored in some embodiments on and/or by an element management server (EMS) such as EMS 220 of FIG. 2, and/or one or more other nodes configured to provide configuration to femtocells or other CPEs as they register, to enable them to self-configuration for operation with the mobile telecommunications network. In the example shown, bulk configuration table 802 appears in a state in which resources available for assignment to registering CPEs have been identified, but no set (row) of resources has as of yet been assigned to any particular CPE, as indicated in this example by the absence of any values in the column labeled "FCid". The bulk configuration table 802 includes in this example columns used to store for each set of resources and/or configuration data the following: a routing zone in which the resources are to be used and/or the CPE to which they are assigned is located; a mobile country code (MCC); a mobile network code (MNC); a location area code (LAC); a cell identifier (CI); a UMTS absolute radio frequency channel number (UARFCN); a code group; the FCid or other unique identifier of the CPE to which the set of resources and/or configuration data has been assigned; and a scrambling code assigned to be used by the CPE identified by the FCid. The FCid and scrambling code columns are completed as each set of resources is assigned, line-by-line, as CPEs register and self-configure, as described more fully below.

Figure 8B:
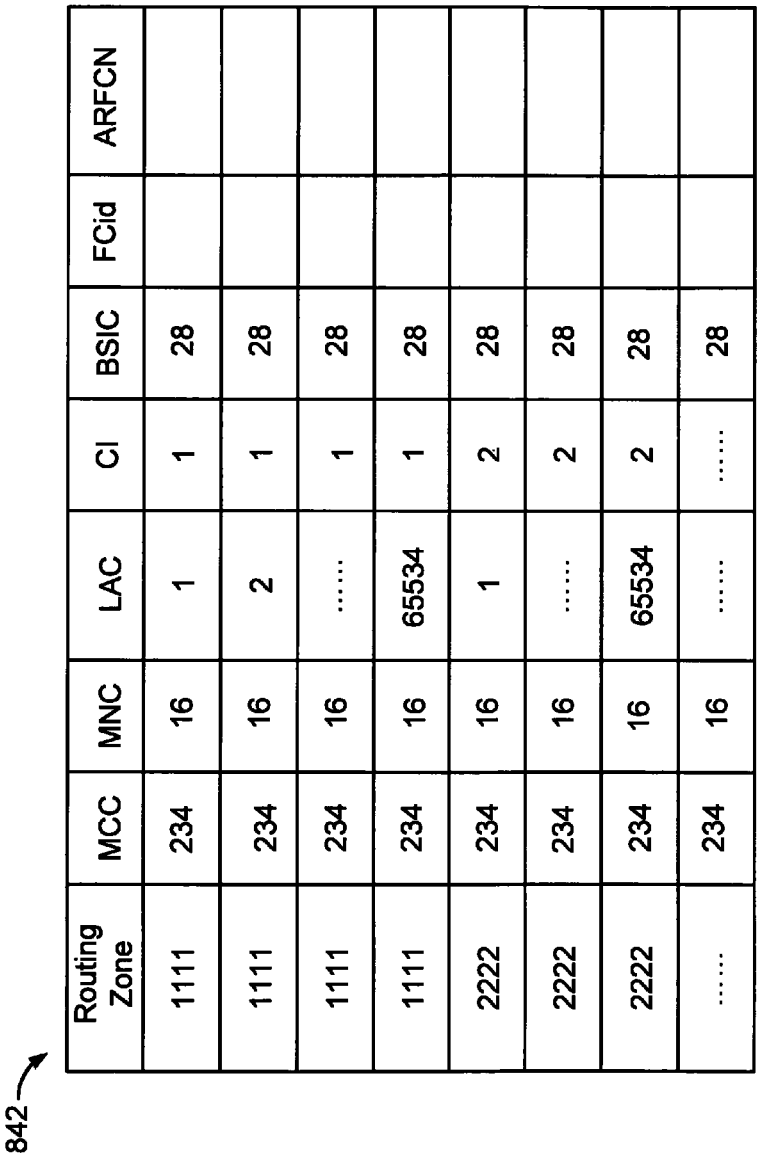
FIG. 8B is a block diagram illustrating an embodiment of a bulk configuration table for GSM femtocells.

FIG. 8B is a block diagram illustrating an embodiment of a bulk configuration table for GSM femtocells. The bulk configuration table 842 is stored in some embodiments on and/or by an element management server (EMS) such as EMS 416 of FIG. 4, and/or one or more other nodes configured to provide configuration to femtocells or other CPEs as they register, to enable them to self-configuration for operation with the mobile telecommunications network. In the example shown, bulk configuration table 842 appears in a state in which resources available for assignment to registering CPEs have been identified, but no set (row) of resources has as of yet been assigned to any particular CPE, as indicated in this example by the absence of any values in the column labeled "FCid". The bulk configuration table 842 includes in this example columns used to store for each set of resources and/or configuration data the following: a routing zone in which the resources are to be used and/or the CPE to which they are assigned is located; a mobile country code (MCC); a mobile network code (MNC); a location area code (LAC); a cell identifier (CI); a base station identifier code (BSIC), which the femtocell will broadcast on the synchronization channel; a code group; the FCid or other unique identifier of the CPE to which the set of resources and/or configuration data has been assigned; and an absolute radio frequency channel number (ARFCN) assigned to be used by the CPE identified by the FCid.

FIG. 9A is a block diagram illustrating an embodiment of an access control database table for UMTS femtocells. In some embodiments, the access control database table 902 is stored in an access control database such as ACDB 222 of FIG. 2. In the example shown, table 902 includes storage locations for a CPE identifier (FCid); a user address indicating a customer premises on which the CPE is to be located and operated; a routing zone with which the CPE is associated; and an access control white list (ACWL) identifying, by international mobile subscriber identity (IMSI), each user equipment that is authorized to access the mobile telecommunications network via the CPE.

FIG. 9B is a block diagram illustrating an embodiment of an access control database table for GMS femtocells. In some embodiments, the access control database table 942 is stored in an access control database such as AC 420 of FIG. 4. In the example shown, table 902 includes storage locations for a CPE identifier (FCid); a user address indicating a customer premises on which the CPE is to be located and operated; a routing zone with which the CPE is associated; and an access control white list (ACWL) identifying, by international mobile subscriber identity (IMSI) and temporary mobile subscriber identity (TMSI), each user equipment that is authorized to access the mobile telecommunications network via the CPE.

FIG. 10A is a block diagram illustrating an embodiment of an access control table for UMTS femtocells. In some embodiments, a network node configured to provide controlled access to a mobile telecommunications network, such as MSC 224 of FIG. 2, maintains the table 1002 shown in FIG. 10A. In the example shown, the access control table 1002 includes for each CPE (e.g., row) an FCid; routing zone; MCC; MNC; LAC; CI; and ACWL (IMSI). In various embodiments, an MSC configured to provide to femtocell users controlled access to a mobile network uses the data in table 1002 to ensure that only authorized users are allowed to use a femtocell.

FIG. 10B is a block diagram illustrating an embodiment of an MSC server access control table for GSM femtocells. In some embodiments, an MSC server such as MSCS 422 of FIG. 4 maintains table 1042 of FIG. 10B. In the example shown, the access node table 1002 includes for each CPE (e.g., row) an FCid; routing zone; MCC; MNC; LAC; CI; and ACWL (IMSI and TMSI).

Point of Sale

Figure 11A:
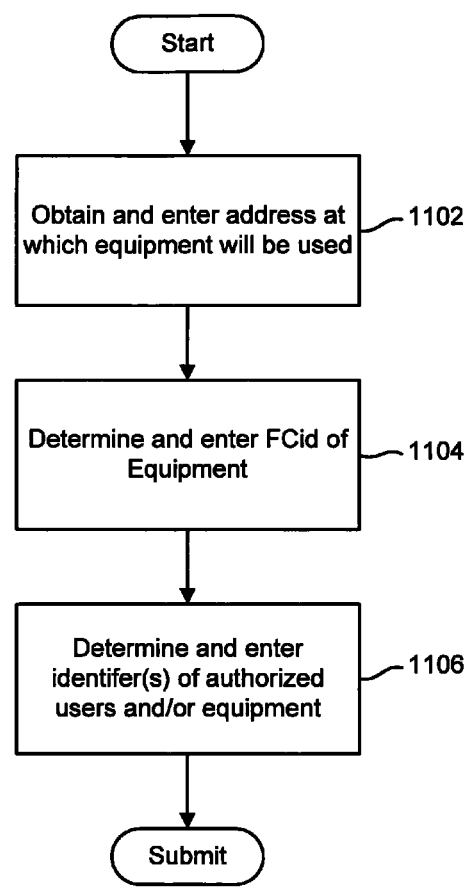
FIG. 11A is a flow chart illustrating an embodiment of a process for associating customer premise data with a CPE at a point of sale.

FIG. 11A is a flow chart illustrating an embodiment of a process for associating customer premise data with a CPE at a point of sale. In the example shown, a customer premises address at which a CPE is to be used is obtained and entered via a graphical user interface or other interface (1102). For example, a retail representative asks the customer for the customer premises address and enters same at a computer or other terminal, reports same by telephone, records same in a postcard or other paper record, etc. In some embodiments, information from which a customer premises address may be determined and/or inferred, e.g., a subscriber phone number from which an account address can be determined, is gathered and entered. A unique identifier (FCid) associated with the CPE is determined, e.g., by reading documentation, packaging, tags, labeling, or other records, and/or by accessing information stored electronically or otherwise on the CPE itself, e.g., in a SIM or other device and entered in the user interface and/or other reporting mechanism (1104), e.g., in a manner that associates the customer premises address with the unique identifier of that CPE. Optionally, identifier(s) associated with authorized user(s) of the CPE, such as mobile phone numbers, IMSI, etc., are determined and entered via the same interface, in a manner that associates such authorized users with the unique identifier of that CPE (1106). The gathered and entered customer premises address, CPE unique identifier, and authorized user data is submitted, in various embodiments, e.g., by the retail representative selecting an "enter" button or key.

Figure 11B:
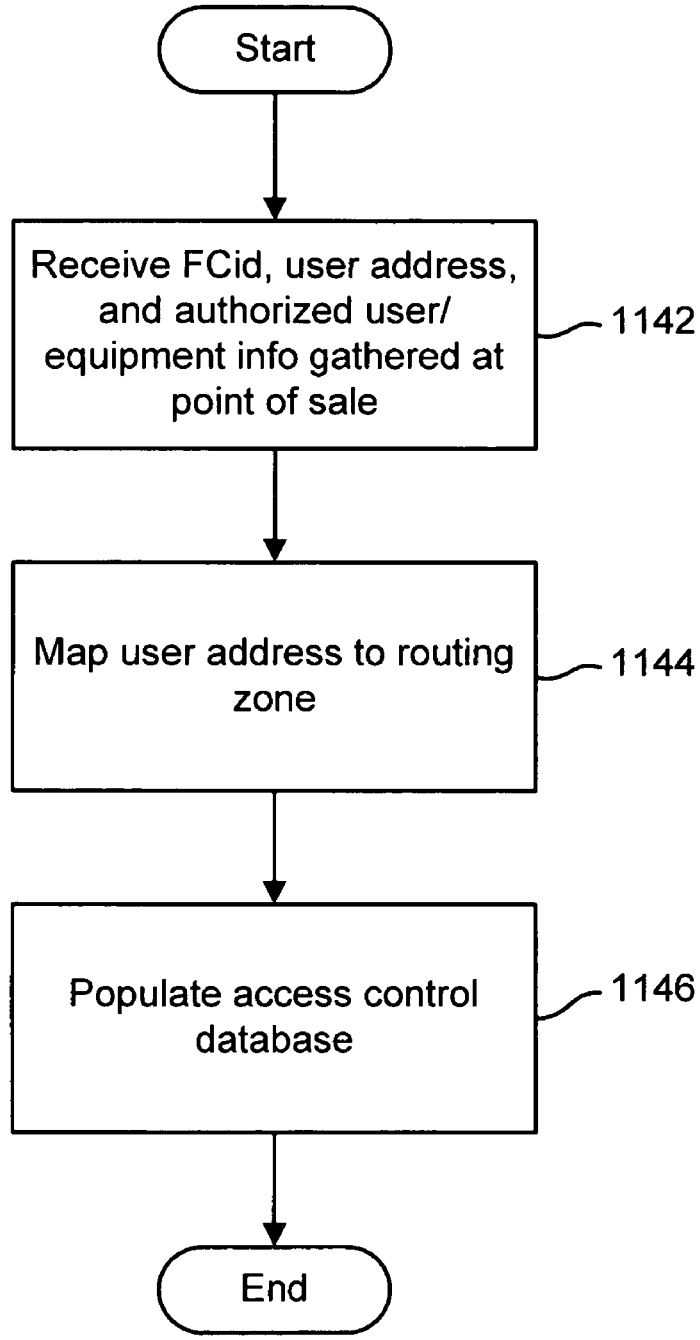
FIG. 11B is a flow chart illustrating an embodiment of a process for automatically mapping information gathered at a CPE point of sale to configuration data for a CPE.

FIG. 11B is a flow chart illustrating an embodiment of a process for automatically mapping information gathered at a CPE point of sale to configuration data for a CPE. In some embodiments, the process of FIG. 11B is performed by a local or remote node that receives the data gathered and entered as described in connection with FIG. 11A. In the example shown, a CPE unique identifier, customer premise address, and authorized user(s) information gathered at the point of sale, e.g., at the time the CPE was sold, is received (1142). The customer premises address is mapped automatically to a routing zone (1144). An access control database record for the CPE is populated (1146), e.g., with the received CPE unique identifier, customer premises address, and authorized user information and the determined routing zone. In some embodiments, the routing zone is determined at the point of sale, included in the information received at 1142, and 1144 is omitted.

Figure 12A:
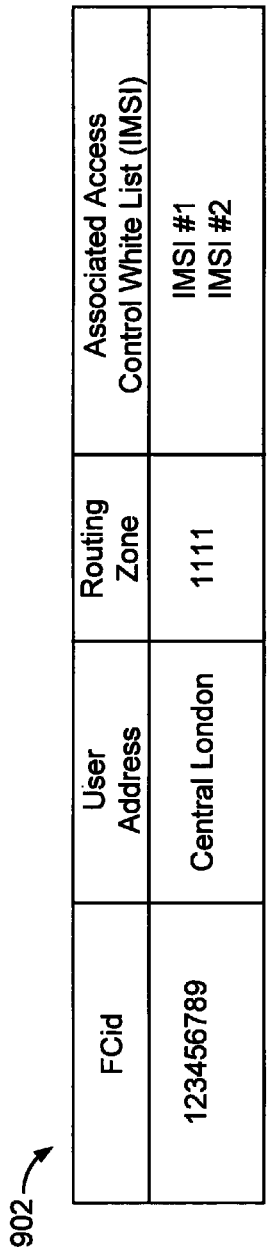
FIG. 12A shows an example of UMTS access control database table that has been populated with CPE data.

FIG. 12A shows an example of UMTS access control database table that has been populated with CPE data. In the example shown, access control database table 902 is shown in a state in which the CPE unique identifier, user address, routing zone, and authorized user data have been populated for a CPE with FCid "123456789", e.g., as described in FIGS. 11A and 11B.

Figure 12B:
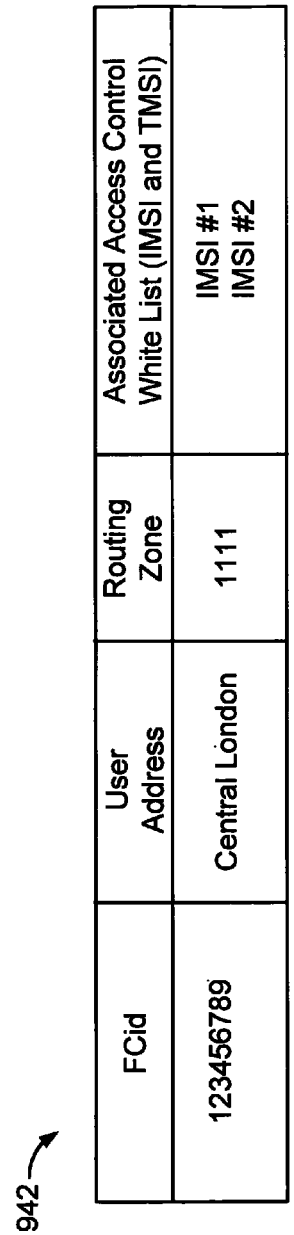
FIG. 12B shows an example of GSM access control database table that has been populated with CPE data.

FIG. 12B shows an example of GSM access control database table that has been populated with CPE data. In the example shown, access control database table 942 is shown in a state in which the CPE unique identifier, user address, routing zone, and authorized user data have been populated for a CPE with FCid "123456789", e.g., as described in FIGS. 11A and 11B.

Post-Sale a. UMTS Femtocell Auto-Discovery and Self-Configuration

Figure 13:
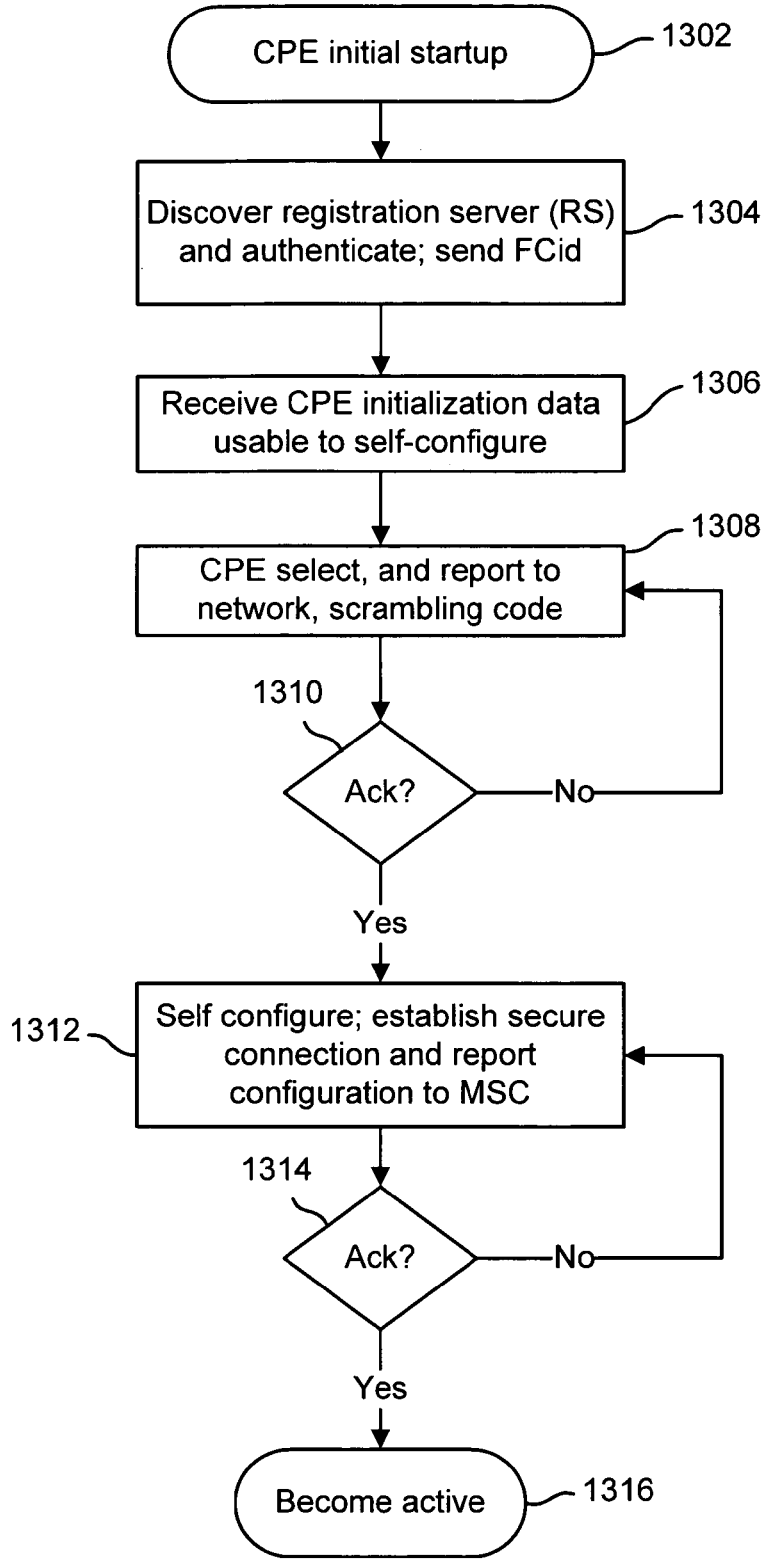
FIG. 13 is a flow chart illustrating an embodiment of a process for UMTS CPE auto-discovery and self-configuration.

FIG. 13 is a flow chart illustrating an embodiment of a process for UMTS CPE auto-discovery and self-configuration. In some embodiments, the process of FIG. 13 is implemented by a UMTS femtocell or other small scale base station. In the example shown, upon initial startup (1302), the CPE auto-discovers a registration server (RS) associated with the UMTS mobile telecommunications network with which the CPE is to be used, performs authentication, and sends its FCid (or other unique identifier) to the RS (1304). In some embodiments, the CPE is pre-configured to auto-discover the RS, e.g., using a URL (e.g., http://register.[MNO or other domain name].com) or other identifier associated with the RS on the network via which the CPE is to connect to the mobile network, e.g., the Internet or another IP network. The CPE receives in response resource and/or other initialization data, e.g., from the RS or directly or indirectly from an associated node, such as an EMS (1306). In some embodiments, the initialization data includes one or more RF or other resources available to be used by the CPE, e.g., as determined by an EMS or other node using a bulk configured CPE configuration data set, as described herein. Examples of initialization data include a UARFCN, code group, and/or one or more assigned and/or candidate scrambling codes. The CPE selects a scrambling code, e.g., based at least in part on scanning the RF environment, and reports the selected scrambling code to the mobile network (1308). In some embodiments, the UMTS CPE receives at 1306 a UARFCN and code group, determined by the mobile network (e.g., EMS) at least in part by mapping the provided FCid to a routing zone (e.g., using the access control database as described above) and selecting from the bulk configured CPE configuration data a line (or other set) that matches that routing zone and has not already be assigned. In some embodiments, at 1308 the CPE tests one or more scrambling codes from the indicated code group and reports back to the mobile network a scrambling code selected by the CPE based on the tests to be suitable or most suitable for use. In some alternative embodiments, the CPE tests one or more scrambling codes, reports the raw results, and a mobile network node makes the selection. Once acknowledge of the scrambling code selection is received by the CPE from the mobile network (1310), the CPE configures itself to operate using the resources assigned to and/or selected by itself, establishes connection to the MSC, and reports its configuration data to the MSC (1312). Upon receiving an acknowledgement that its configuration data has been received by the MSC (1314), the CPE becomes active and available to provide to user equipment(s) access to services provided at least in part via the mobile telecommunications network (1316).

Figure 14:
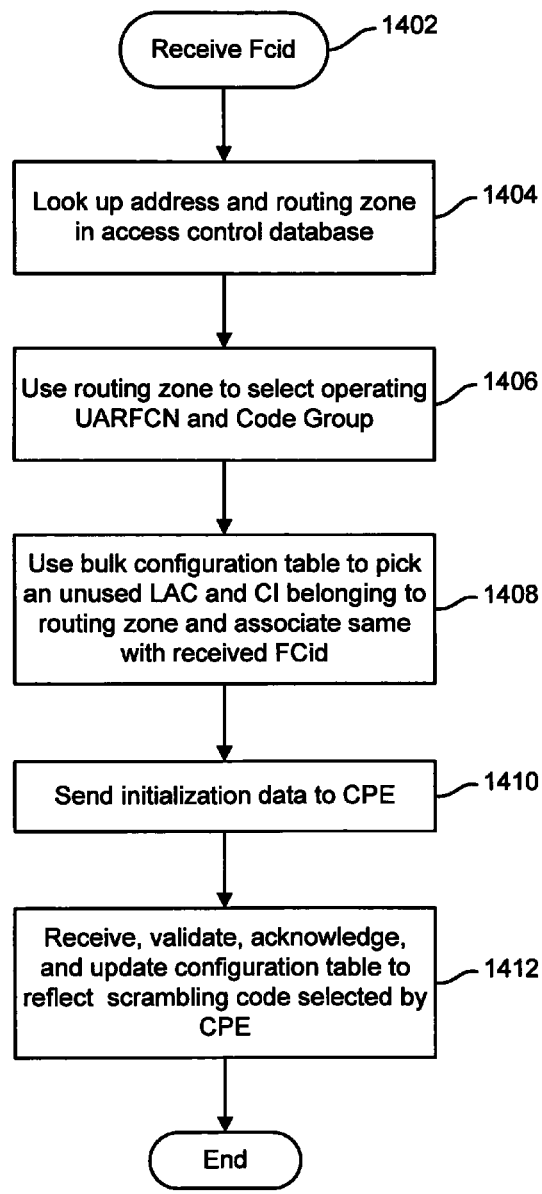
FIG. 14 is a flow chart illustrating an embodiment of a process for providing limited initialization data to a UMTS CPE.

FIG. 14 is a flow chart illustrating an embodiment of a process for providing limited initialization data to a UMTS CPE. In some embodiments, the process of FIG. 14 is implemented by one or more mobile network elements, such as EMS 220 of FIG. 2. In the example shown, an FCid or other unique CPE identifier is received (1402) and used to look up a customer premises address and routing zone in an access control database (1404). In some embodiments, the customer address and/or routing zone are gathered at the point of sale and/or determined subsequently based on information gathered at the point of sale, as described above. The determined routing zone is used to select an operating UARFCN and code group (1406). In addition, an unused LAC and CI belonging to the routing zone are selected and associated with the received FCid or other unique CPE identifier (1408), e.g., by selecting an unused line from a bulk configured CPE configuration data table that has a routing zone that matches the routing zone with which the CPE was determined in 1404 to be associated and entering the received FCid in the corresponding location on that line of the table. FIG. 16A shows EMS CPE configuration data table 802 of FIG. 8A with the FCid field filled in. The initialization data determined in 1406 and 1408 are sent to the CPE (1410). A scrambling code selected by the CPE, based on the configuration data sent in 1410, is received, validated, acknowledged, and used to update the CPE configuration data table at the EMS (or other mobile network node) (1412). FIG. 16B shows EMS CPE configuration data table 802 of FIG. 8A with both the FCid field and scrambling code field filled in.

Figure 17:
FIG. 17 shows local CPE configuration table 702 of FIG. 7A as populated in connection with self-configuration of a UMTS CPE (e.g., femtocell) as described above.

In some embodiments, the CPE uses the initialization data obtained from the EMS (FIG. 14) to self-configure and connect to the mobile network via an MSC or other node configured to provide controlled access to a mobile telecommunications network, as in step 1312 of FIG. 13. FIG. 17 shows local CPE configuration table 702 of FIG. 7A as populated in connection with self-configuration of a UMTS CPE (e.g., femtocell) as described above. In some embodiments the neighbor list is populated at least in part by one, both, or a combination of the CPE sensing the local RF environment and/or the mobile network identifying neighbor cells (e.g., macrocellular network base stations) based at least in part on the customer premises address associated with the CPE's unique identifier.

Figure 15:
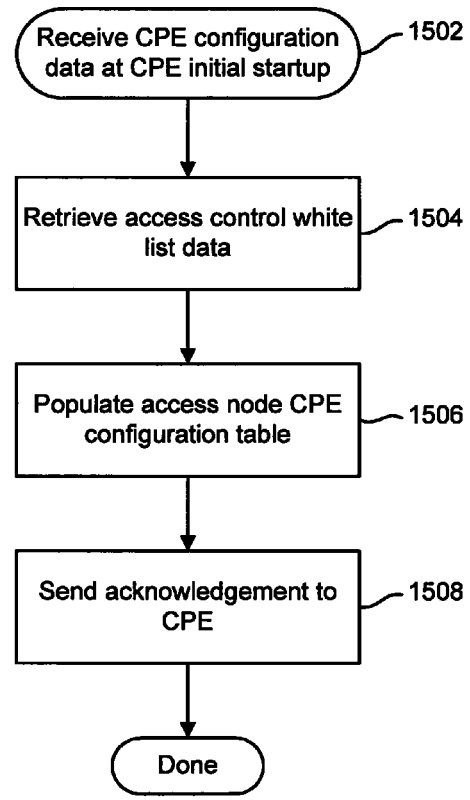
FIG. 15 is a flow chart illustrating an embodiment of a process for populating CPE configuration data at an access node.

FIG. 15 is a flow chart illustrating an embodiment of a process for populating CPE configuration data at an access node. In the example shown, CPE configuration data is received (1502) and used to retrieve an access control white list (ACWL, listing authorized users of the CPE) (1504). Examples include ACWL information gathered at a CPE point of sale as described above. In some embodiments, the FCid or other unique CPE identifier is used to retrieve the ACWL. The ACWL and received configuration data are used to populate a CPE configuration table at the AN (1506), after which an acknowledgement is sent to the CPE (1508) indicating to the CPE that the AN is now configured to provide access to the mobile telecommunications network, via the CPE, to UE's that are authorized users of the CPE (i.e., are on the ACWL).

Figure 18:
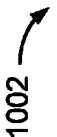
FIG. 18 shows the access node CPE configuration data table 1002 of FIG. 10A as populated by the AN in connection with CPE startup as described above in connection with FIG. 15.

FIG. 18 shows the access node CPE configuration data table 1002 of FIG. 10A as populated by the AN in connection with CPE startup as described above in connection with FIG. 15.

b. GSM Femtocell Auto-Discovery and Self-Configuration

Figure 19:
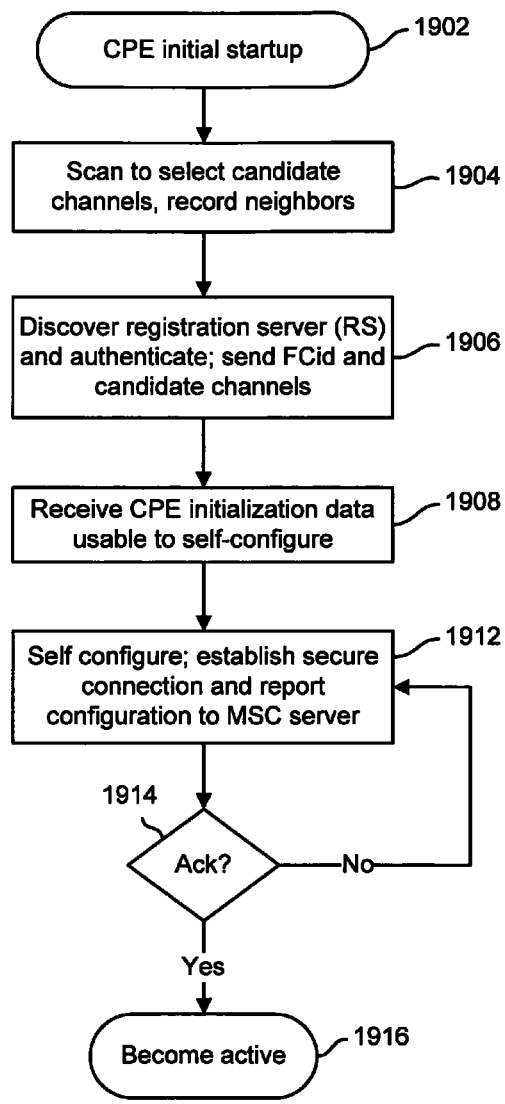
FIG. 19 is a flow chart illustrating an embodiment of a process for GSM CPE auto-discovery and self-configuration.

FIG. 19 is a flow chart illustrating an embodiment of a process for GSM CPE auto-discovery and self-configuration. In some embodiments, the process of FIG. 19 is implemented by a GSM femtocell or other small scale base station. In the example shown, upon initial startup (1902), the CPE scans the RF environment to select candidate channel(s) and/or detect neighbor cells (1904). The CPE auto-discovers and connects via an IP or other access network to a mobile network registration node (e.g., RS), performs authentication, and sends it's FCid (or other unique identifier) and candidate RF channel(s) (1906). The CPE receives from the mobile network CPE resource and/or other initialization data, e.g., an assigned ARFCN (1908), which initialization data the CPE uses to self-configure (FIG. 23 shows an example of local CPE configuration table 704 as populated by a GSM CPE in connection with self-configuration), and to establish a secure connection to and report its configuration data to a serving MSC server (1912). Once acknowledgement has been received from the MSC server (1914), the CPE becomes active (1916) and begins providing service to authorized users.

Figure 20:
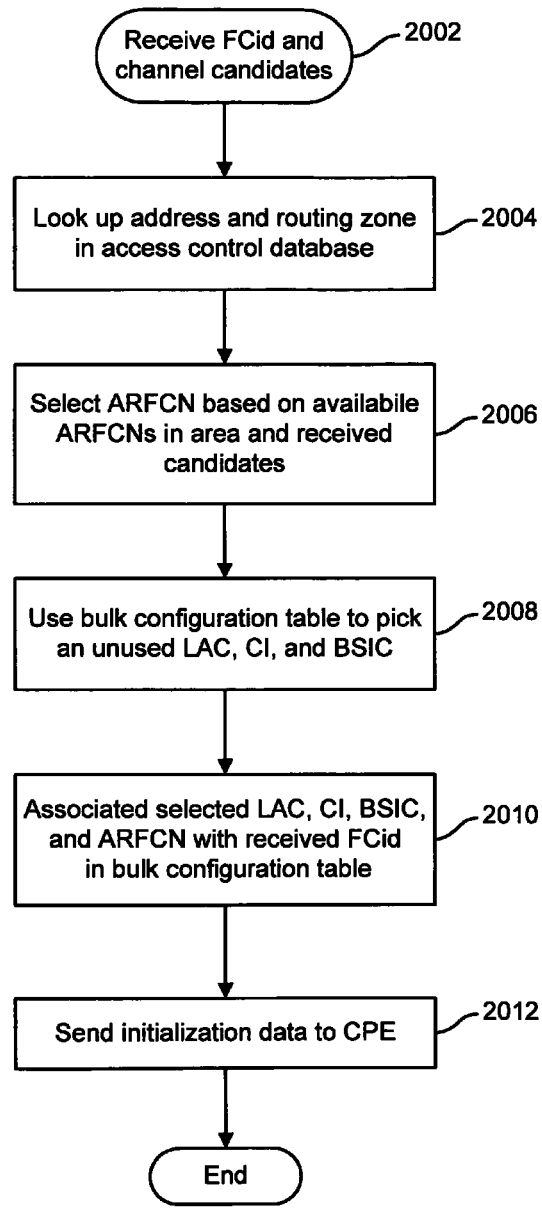
FIG. 20 is a flow chart illustrating an embodiment of a process for providing GSM CPE initialization data.

FIG. 20 is a flow chart illustrating an embodiment of a process for providing GSM CPE initialization data. In some embodiments, the process of FIG. 20 is implemented by one or more mobile network elements, such as EMS 416 of FIG. 4. In the example shown, an FCid or other unique CPE identifier and zero or more candidate ARFCN's are received (2002). The FCid is used to look up a customer premises address and routing zone in an access control database (2004). An ARFCN to be used by the CPE is selected based on available ARFCNs in the area and the list of candidates, if any, received from the CPE (2006). A bulk configured CPE configuration data table is used to select for use by the CPE an unused LAC, CI, and BSIC (2008), e.g., by selecting a next unused line having the same routing zone as the CPE. The bulk configured CPE configuration data table is updated to associate the FCid of the CPE and the assigned ARFCN with the assigned LAC, CI, and BSIC (2010). The assigned configuration data is sent to the CPE (2012). FIG. 22 shows an example of the bulk configured CPE configuration data 842 of FIG. 8B as populated by an EMS or other node.

Figure 21:
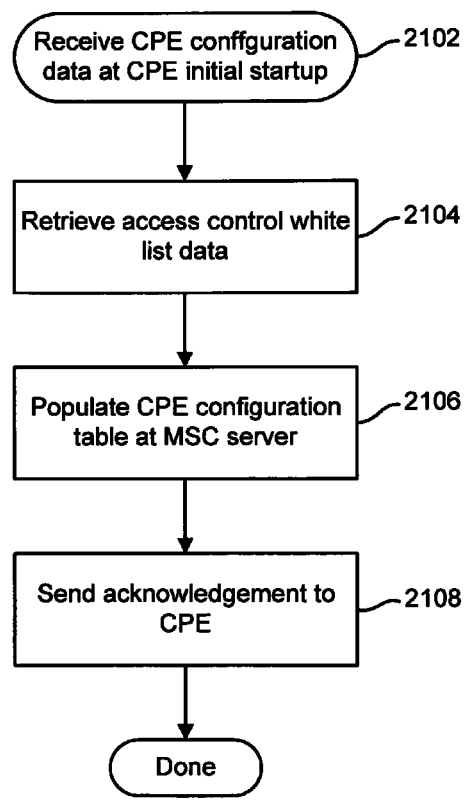
FIG. 21 is a flow chart illustrating an embodiment of a process for populating CPE configuration data at an MSC server.

FIG. 21 is a flow chart illustrating an embodiment of a process for populating CPE configuration data at an MSC server. In the example shown, CPE configuration data is received (2102) and used to retrieve an access control white list (ACWL, listing authorized users of the CPE) (2104). The ACWL and received configuration data are used to populate a CPE configuration table at the MSCS (2106), after which an acknowledgement is sent to the CPE (2108) indicating to the CPE that the MSC server is now configured to provide access to the mobile telecommunications network, via the CPE, to MS's that are authorized users of the CPE (i.e., are on the ACWL).

FIG. 24 shows the MSC server CPE configuration data table 1042 of FIG. 10B as populated by the MSC server in connection with CPE startup as described above in connection with FIG. 21.

While the examples described in detail above refer to UMTS and/or GSM femtocells and/or networks, the techniques described herein may be applied in any context in which a mobile telecommunications CPE, such as a femtocell or other small scale base station, is desired to be able to be installed by a relatively unsophisticated end user, such as a mobile subscriber, and requires one or more radio frequency (e.g., channel number, scrambling code) or other resources to be assigned to the CPE by the mobile telecommunications network in order for the CPE to be able to be configured itself properly for operation with the mobile telecommunications network.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A mobile telecommunication base station, comprising:
   a communication interface configured to connect to an access network other than a mobile telecommunication network with which the base station is associated; and
   a processor coupled to the communication interface and configured to:
   establish a connection, via the access network, to a first element associated with the mobile telecommunication network, wherein the first element authenticates the base station, wherein the first element is coupled to an access control database via a management server and the first element is communicatively disposed between an IP network of the access network and the management server;
   receive, via the access network, an initialization data from the access control database based on a subscriber's information gathered prior to a subscriber powering on the base station;

determine additional information by scanning a surrounding RF environment;
use the initialization data and the additional information to configure the base station to provide access to mobile telecommunication services using a resource determined based on the initialization data; and
establish a connection to a mobile switch center through a second element associated with the mobile telecommunication network, wherein the second element aggregates traffic from the base station and other mobile telecommunication base stations that use the IP network of the access network.

2. The mobile telecommunication base station of claim 1, wherein the resource comprises at least one of the following: a radio frequency; a radio channel; a code group; a scrambling code; a location area code (LAC); a cell identifier (CI); and a base station identifier code (BSIC).

3. The mobile telecommunication base station of claim 1, wherein the processor is further configured to send to the first element a unique identifier associated uniquely with the base station.

4. The mobile telecommunication base station of claim 3, wherein the first element, or another node associated with the first element, is configured to select the initialization data based at least in part on the unique identifier.

5. The mobile telecommunication base station of claim 1, wherein the processor is further configured to auto-discover the first element associated with the mobile telecommunication network.

6. The mobile telecommunication base station of claim 1, wherein the resource comprises a code group and the processor is further configured to select a scrambling code included in the code group at least in part by performing an operational test using the scrambling code.

7. A method for configuring a mobile telecommunication base station, comprising:
establishing a connection, via an access network other than a mobile telecommunication network with which the base station is associated, to a first element associated with the mobile telecommunication network, wherein the first element authenticates the base station by using a MAC address associated with the base station;
receiving, via the access network, an initialization data from the access control database based on a subscriber's information gathered prior to a subscriber powering on the base station;
determining additional information by scanning a surrounding RF environment;
using the initialization data and the additional information to configure the base station to provide access to mobile telecommunication services using a resource determined based on the initialization data; and
establishing a connection to a mobile switch center through a second element associated with the mobile telecommunication network, wherein the second element aggregates traffic from the base station and other mobile telecommunication base stations that use an IP network of the access network.

8. A communication system, comprising:
a base station that connects to an access network other than a mobile telecommunication network with which the base station is associated,
wherein the base station establishes, via the access network, a connection to an element associated with the mobile telecommunication network, receives network initialization data via the access network from the element, and uses the network initialization data provided by the element to configure the base station to provide access to mobile telecommunication services using a resource determined based on the network initialization data from an access control database which is based on a subscriber's information gathered prior to a subscriber powering on the base station, wherein the base station establishes a secure connection to a mobile switch center.

9. The communication system according to claim 8, comprising second base stations, wherein the base station and the second base stations are connected to a second element via an IP network of the access network, wherein the IP network is communicatively disposed between the second element and the base station and the second base stations.

10. The communication system according to claim 9, wherein the second element is associated with the mobile telecommunication network, and wherein the second element aggregates traffic from the base station and the second base stations.

11. The communication system according to claim 10, wherein the second element is coupled to the mobile switch center via a GSM interface or a UMTS interface.

12. The communication system according to claim 9, wherein the IP network is communicatively disposed between the element and the base station and the second base stations.

13. The communication system according to claim 9, wherein the element and the second element are in communication.

14. The communication system according to claim 8, comprising a wireless cellular communication device that communicates with the base station over a Uu air interface or a Um air interface.

15. The communication system according to claim 8, wherein the element is coupled to the access control database via a management server, and wherein the element is communicatively disposed between an IP network and the management server.

16. The communication system according to claim 8, wherein the base station is pre-configured with a URL associated with the element, and wherein the base station auto-discovers the element using the pre-configured URL.

17. The communication system according to claim 8, wherein the element authenticates the base station by using a MAC address associated with the base station.

18. The communication system according to claim 17, wherein the initialization data is selected from an available set of configuration data based on the MAC address and a geographic location of the base station.

19. The communication system according to claim 8, wherein the base station determines additional information by scanning a surrounding RF environment, and wherein the base station uses the initialization data and the determined additional information to configure the base station to provide access to mobile telecommunication services.

20. The communication system according to claim 8, wherein the resource is determined based on the initialization data includes scrambling codes or code sets.

* * * * *